Jan. 13, 1953 A. C. DANKS Re. 23,613
BUTTERFLY VALVE
Original Filed March 26, 1945 2 SHEETS—SHEET 1
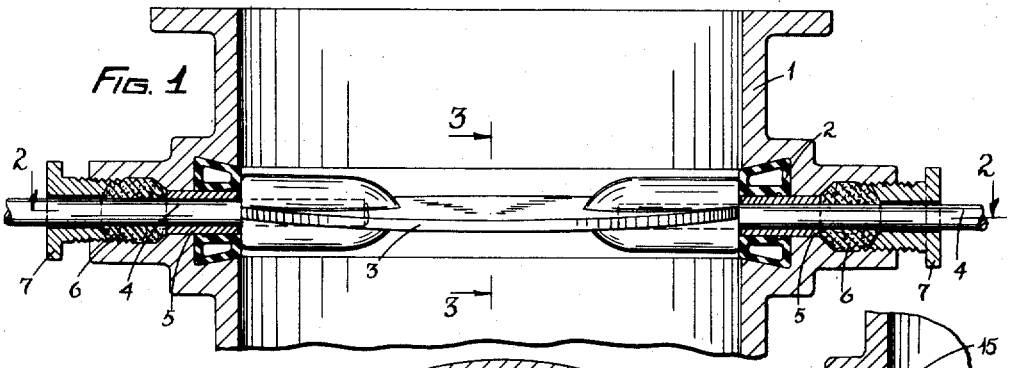
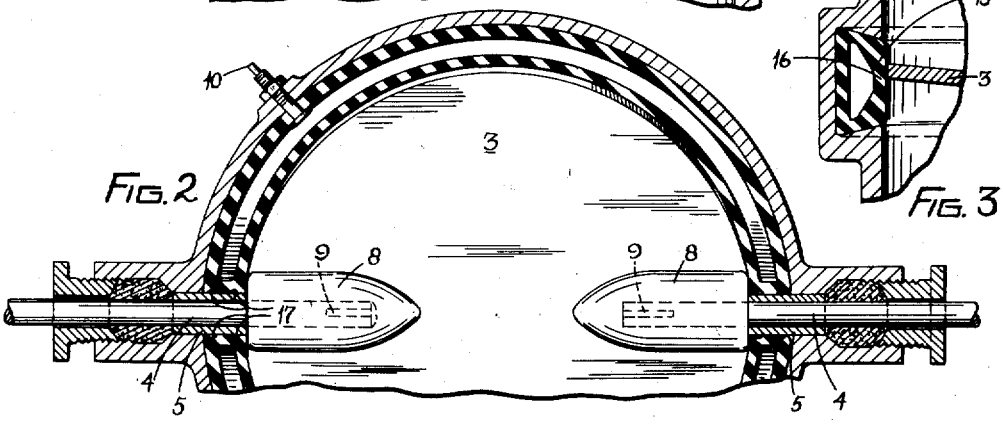
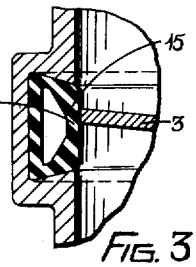
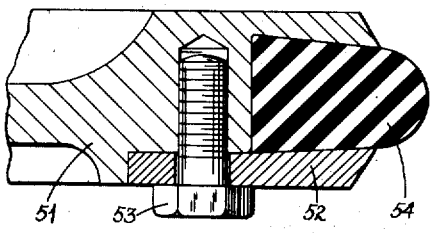
FIG. 10
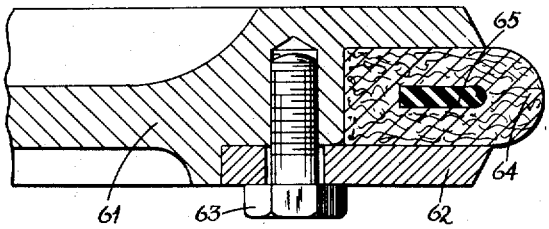
FIG. 11
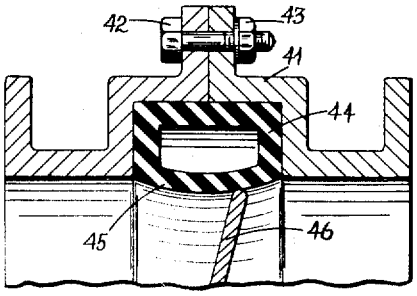
FIG. 9
INVENTOR.
ALFRED C. DANKS
BY Richey & Watts
ATTORNEYS

BUTTERFLY VALVE

Original Filed March 26, 1945 2 SHEETS—SHEET 2

INVENTOR.
ALFRED C. DANKS
BY Richey & Watts
ATTORNEYS

Reissued Jan. 13, 1953

Re. 23,613

UNITED STATES PATENT OFFICE 23,613

BUTTERFLY VALVE

Alfred C. Danks, Cleveland, Ohio

Original No. 2,488,380, dated November 15, 1949, Serial No. 584,768, March 26, 1945. Application for reissue August 2, 1950, Serial No. 177,324

6 Claims. (Cl. 251—11)

Matter enclosed in heavy brackets [ ] appears in the original patent but forms no part of this reissue specification; matter printed in italics indicates the additions made by reissue.

The present invention relates to the valve art and particularly to a new valve of the butterfly type.

Butterfly valves have been known and used for many years in handling fluids such as water, oil, air and certain gases. These valves consisted essentially of a metal disk rotatably mounted on diametrical shafts in a cylindrical body. One shaft, or one end of the shaft in case a single shaft was used, extended out thru the side wall of the body where it was attached to means for rotating the disk into open or closed position.

The prior butterfly valves possess certain inherent disadvantages. When the disk was fitted closely enough to the body to seal against fluid flow, the frictional forces which had to be overcome in rotating the valve were large and imposed heavy loads on the disk rotating means and disk shaft. When such a close fit existed at one temperature it varied with temperature changes in use. If the disk expanded to a greater extent than the body the initial close fit became closer and the frictional loads became higher. If the disk contracted to a greater extent than the body, the initial close fit became looser and leakage past the disk took place. Because of these and other inherent characteristics the prior butterfly valves have not been entirely satisfactory with fluids at high pressures or variable temperatures or both, or with volatile liquids or poisonous gases.

Many efforts have been made heretofore to reconcile these conflicting factors but, so far as I know, none of those efforts have been entirely satisfactory.

I have discovered that the parts of the disk periphery where sealing is most difficult is in the region of the disk shafts. There the edge of the disk is substantially concentric with the opposed inner surface of the valve body when the disk is in a plane transverse to the longitudinal axis of the body. Unless these portions of the disk actually engage the inner surface of the body, leakage will occur at those places, even when a good seal exists elsewhere on the periphery of the disk. Any differential expansion of the disk and the body will alter the nature of the seal in the region of the disk shafts. When the disk expands more than the body, the disk will bind against the body and require increased power to rotate it and may not seal at other parts of its periphery. When the disk contracts more than the body, leakage will occur in the region of the shafts.

The present invention avoids these and other inherent disadvantages of the prior butterfly valves and makes it possible to construct a butterfly valve which has a low substantially constant frictional resistance to rotation of the disk at all times and which will effectively seal fluids whose temperatures may range over two or three hundred degrees F., and from −60° F. to +200° F. or more, and whose pressures may range from less than atmospheric to several hundred pounds per square inch. These results are obtained by providing an effective sealing action in the regions of the disk shafts. This sealing action may be attained by the use of resilient compressible means which engage the interior surface of the body and the disk in the region of its shafts. This means may take the form of an endless tube disposed in the wall of the valve body or a rim on the disk. Both tube and rim may be used together. Butterfly valves constructed in accordance with the present invention have low frictional resistance to rotation of the disk under all service conditions of temperature and pressure and substantially complete sealing under widely varying temperatures and fluid pressures.

The present invention will be better understood by those skilled in the art from the following description and the drawings which accompany this specification and in which Figure 1 is a central sectional view of one form of valve embodying the present invention with the disk shown in elevation in valve closed position;

Figure 2 is a fragmentary, transverse, sectional view taken on line 2—2 of Fig. 1;

Fig. 3 is a fragmentary, enlarged, sectional view taken on line 3—3 of Fig. 1;

Figure 9 is a fragmentary, longitudinal, sectional view of a modified form of the ring of Figs. 1 and 4;

Figure 10 is a fragmentary, cross-sectional view showing a modified form of disk rim; and Figure 11 is a fragmentary sectional view showing a modified form of disk packing rim for high temperature service conditions.

Figure 4:
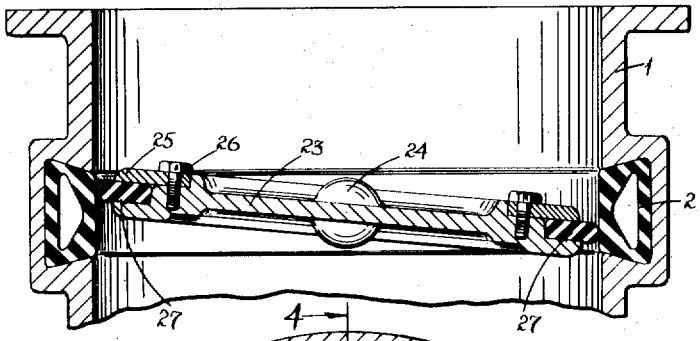
Figure 4 is a longitudinal, fragmentary, central, sectional view of a modified form of valve embodying the present invention and taken on line 4—4 of Figure 5.

The form of the present invention shown in

Figs. 1, 2, and 3 comprises a body 1 having a cylindrical passage therethru and an annular recess which opens into said passage, an endless, hollow, resilient ring 2 positioned in the annular recess and a disk 3 rotatably mounted on short, diametrically opposite shafts 4 which have bearing engagement in sleeve bearings 5 in the walls of the valve body 1. Packing 6 surrounds shafts 4 at the outer ends of bearings 5 and is retained in place by glands 7. At least one of the shafts 4 extends thru its gland 7 far enough for attachment to means (not shown) for rotating the disk in valve body 1.

The disk 3 is provided with bosses *or hubs* 8 into which shafts 4 extend and with keys 9 which engage keyways in the bosses and the shafts and prevent relative rotation thereof. It will be understood that the bosses 8 may be extended all the way across disk 3 and a single shaft used instead of two shafts as illustrated. In Figs. 1 to 3 the disk 3 is shown as slightly inclined to a plane transverse to the longitudinal axis of valve body 1. In many instances this is the position of the disk when the valve is closed, but in other instances the disk may make larger or smaller angles with such a transverse plane.

The ring 2 of Figs. 1, 2 and 3 is endless, hollow and resilient, is preferably wedge-shaped in cross-section, and is seated in the correspondingly wedge-shaped annular recess which is formed in enlarged portions of the valve body 1. Preferably, ring 2 normally projects slightly into the passage thru pipe 1, that is, the inner surface of ring 2 has a slightly smaller diameter than the inner surface of valve body 1. The ring 2 may be inflated by fluid under pressure thru valve 10. Preferably, the inner wall 15 of ring 2 (see Fig. 3) is thick at each edge and thin between those edges, as at 16, so that when inflated the part 16 will be deformed radially inward to make contact with the disk 3 while the thick portions maintain substantially the position shown in Fig. 3.

The bearings 5 are composed of material which forms a good bearing for the shafts 4 of the disk. These bearings may be secured against rotation in the valve body 1, as by being pressed into place, but may be loosely mounted in pipe 1 and have roughened outer surfaces, as indicated at 17, to form a non-rotative joint with ring 2. Lubricant may be supplied to shafts 4 and bearings 5 by impregnating packing 6 with lubricant, or by supplying lubricant to that packing, when needed, thru conventional oil nipples (not shown). Roller or ball bearings may be used in addition to packing 6 and sleeve bearing 5 where the disk is large and added bearing support for shafts 4 is desired.

Ring 2 may be conveniently made of any suitable resilient material, but preferably of natural or synthetic rubber, and having the desired cross-sectional shape such as that shown in Fig. 3, altho this may be varied to suit the working conditions.

It may be produced in one continuous ring with suitable provisions being made for receiving the insertion of shaft bearings 5, and may be provided with a hollow splice within the ring that will allow the pressure supplied to [this splice] *the ring* to be effective on the entire circumference [of the ring] *thereof,* especially [as at 10] against the [hub] *hubs* 8 of [the ring 2] *disc* 3 in Fig. 2.

It will be noted from examination of Figs. 1 and 2 that ring 2 is in close fitting engagement with the periphery of disk 3 in the region of shafts 4 in all positions of the disk and particularly when the disk is in closed position. Preferably, the ring is deformed somewhat by its engagement with the shaft region parts of the disk. This engagement results from the shape, size and location of the ring in those regions and is not dependent on inflation of ring 2. However, the degree of inflation of ring 2 may be, and preferably is, varied depending on the various pressures of fluid in valve body 1 and on various temperatures of that fluid or of the atmosphere surrounding the valve. When the fluid pressures are high the pressure within ring 2 may be increased to make a contact between the disk and ring which will effectively offset that pressure and permit control of the fluid in the valve body. Similarly, when the fluid temperatures are high and the atmosphere surrounding the valve is low the ring 2 may be inflated to a lower extent or not at all, depending upon the extent of differential expansion of the disk and valve body; and when the outside temperature is higher than the temperature of the disk the ring 2 may be inflated sufficiently to maintain sealing contact of the ring and disk thruout the region of the shaft.

Figure 5:
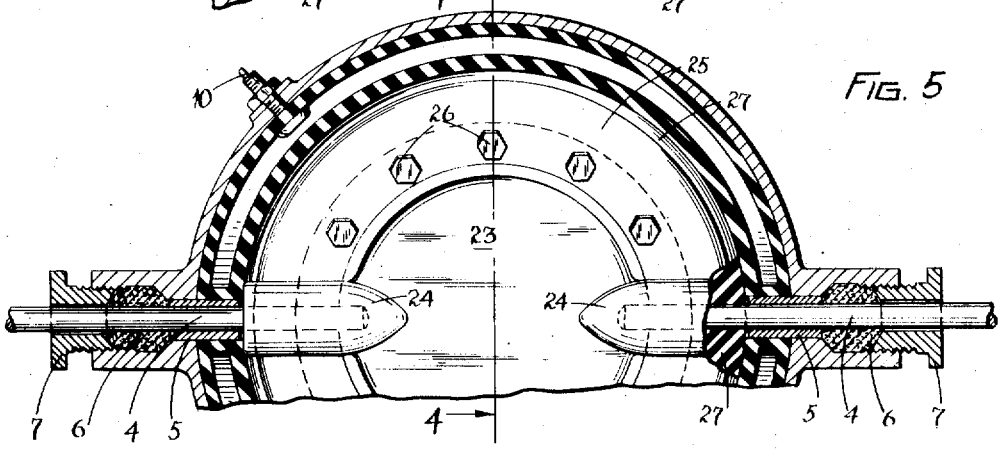
Figure 5 is a fragmentary, transverse, sectional view of the valve shown in Fig. 4 with the disk in elevation.

In Figs. 4 and 5 the valve body 1 and ring 2, shafts 4, bearings 5, packing 6, glands 7 and valve 10 are substantially like the correspondingly numbered parts of Figs. 1 to 3. The disk 23 has bosses *or hubs* 24 to receive and be attached to shafts 4 but disk 23 has a smaller outside diameter than the inside diameter of valve body 1. At its periphery a ring 25 is attached to disk 23 as by cap screws 26 and the disk is cut away to provide a space partly defined by ring 25 in which is mounted a rim 27 composed of resilient or deformable material. The rim 27 consists of two substantially semi-circular segments each pressing at its ends against both of shafts 4 and both being engageable thruout substantially their full lengths with ring 2. As Fig. 5 clearly indicates, ring 2 makes sealing contact with rim 27 and bosses 24 in the region of shafts 4 and, additionally, rim sections 27 have tight fitting engagement at their ends with shafts 4. Preferably, the rim and ring are compressed or deformed in those regions when in assembled position. Thus, a tight seal is provided at all times between the disk 1 and ring 2 in the region of the disk shafts.

The ring 2 of Figs. 4 and 5 may be inflated if desired, after the manner described in connection with Figs. 1, 2 and 3 and the operation of apparatus shown in Figs. 4 and 5 is substantially the same as that of the apparatus of Figs. 1, 2 and 3.

Figure 6:
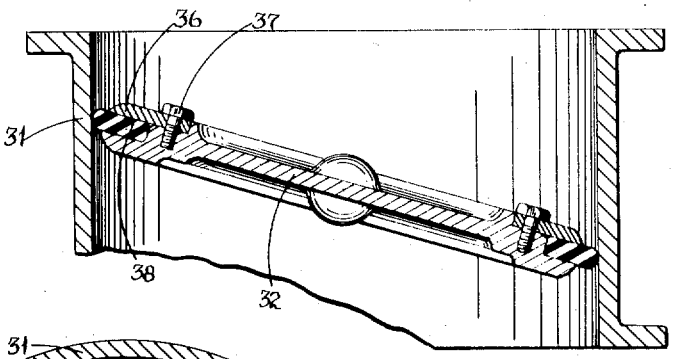
Figs. 6 and 7 are views similar, respectively, to Figs. 4 and 5 but showing another modified form of the invention.
Figure 7:
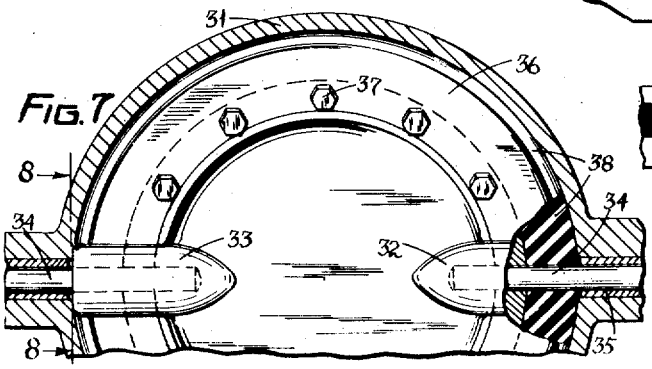
Figure 8:
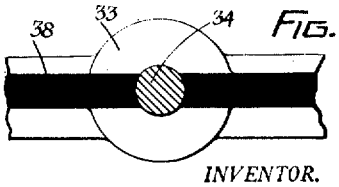
Figure 8 is a fragmentary side elevational view of the disk of Fig. 7 taken on line 8—8.

In Figs. 6, 7 and 8 the invention is embodied in another modified form. Here the valve body has a cylindrical inner metal surface defining a gas passage and the disk 32 is provided with bosses 33 which receive and are attached to shafts 34 which have bearing support in sleeve bearings 35 mounted in pipe 31. Packing glands (not shown), but similar to those shown in Figs. 2 and 5, or any other desired means for lubricating shafts 34, may be employed. The disk 32 is cut away at its periphery and is provided with a ring 36 which is attached to the disk, as by cap screws 37. In the space defined by the disk and ring 36 a rim 38 of resilient material is clamped in place and projects sufficiently far beyond the periphery of the disk to engage the inner surface of pipe 31. As is clearly shown in Figs. 7 and 8, the rim [36] 38 consists of two sections each approximately semi-circular in extent and each bearing at its ends pressed against shafts 34 and the inner surface of pipe 1. Preferably, the radial length of rim 38 is such that when disk 32 and rim 38 are assembled in pipe 31 the rim will be compressed between the inner surface of valve body 1 and the disk in the region of its shafts so that, regardless of differential expansion and contraction, the rim 38 will always bear against the inner surface of valve body 1 and against shafts 34 and seal against the passage of fluid in the regions of the shafts.

Fig. 9 shows a modified form of valve body 1 of Figs. 1 to 5 and 31 of Figs. 6 and 7; and also a modified form of ring 2 of Figs. 1 to 5. In Fig. 9 the valve body 41 is made in two similar pieces which are so shaped that when connected together, as by bolts 42 and nuts 43, they form an annular recess for ring 44. This ring 44 is generally rectangular in cross-section but has an inwardly bowed inner wall 45 which projects beyond the inner surface of pipe 41. The inner surface of wall 45 is curved and may make sealing contact with the periphery of disk 46 without being indented to an undesirable extent by the disk with possible resultant scuffing of that surface by the disk.

While hollow, resilient rings of two cross-sectional shapes have been shown, it will be understood that rings of various other cross-sectional shapes may be used without departing from the spirit of the present invention. It will also be understood that valve bodies 1 of Figs. 1 to 5 and valve bodies 31 of Figs. 6 and 7 may be made after the fashion of Fig. 9, also without departing from the spirit of the present invention.

In Fig. 10 the disk 51 is provided with a ring 52 which is attached thereto by cap screws 53. The disk 51 has been cut away and the opposed surface of ring 52 has been inclined so as to provide a dovetailed recess in which a resilient or deformable rim 54 may be clamped in position against dislodgement when in use.

In Fig. 11 the disk 61 has been cut away at its periphery and is provided with a ring 62 secured thereto by cap screws 63 and a deformable packing rim is clamped in place between the disk and ring. In this instance the rim 64 is composed of heat resistant material 64 preferably surrounding a resilient core 65. Various materials, typified by asbestos, may be used for packing 64, provided the temperatures encountered are not too high. The core 65 may consist of natural or synthetic rubber or other resilient or deformable material. If desired, the core may be replaced by the material like that of part 64 or of other suitable material.

It will be understood that the dovetailed clamping means of Fig. 10 may be used in lieu of the clamping means shown in Figs. 4, 6 or 11. It will also be understood that where the operating temperatures are higher than can be withstood by natural or artificial rubber the heat resistant rim illustrated in Fig. 11 may be employed but that when natural or synthetic rubber can withstand the temperatures involved it is preferable to use such material for the hollow ring or the rim, or both, instead of the higher heat resistant material.

Also, when the service temperatures are high enough to preclude the safe use of natural or synthetic rubber in rings 2 but low enough to permit the use of heat resistant rims 64, the modification of the present invention shown in Fig. 6 may be used, that is, the sealing action will then depend solely upon engagement of the rim packing on the disk with the metal surface of the valve body. It will also be understood from the foregoing description that when the conditions are suitable the ring 2 may be used with a simple disk such as that shown in Figs. 1 and 2, or with a disk having a rim such as that shown in Figs. 4 or 6, or that the ring 2 may be omitted and a disk employed with a rim of suitable material.

Since the sealing in the region of the shafts of the disk is obtained by employing resilient means to engage the disk and valve body tightly in the region of the disk shafts at all times, regardless of variations in temperature and pressure, it will be understood that the forces required to rotate the disk are low under all conditions and thus that low power rotating means may be used to rotate the disk and that breakage of the disk or shafts, as was frequently the case with prior butterfly valves, is wholly avoided.

Having thus described my invention so that others skilled in the art may be able to understand and practice the same, I state that what I desire to secure by Letters Patent is defined in what is claimed.

What is claimed is:

1. A valve comprising a body having a cylindrical passage, an annular recess opening into said passage, and diametrically opposed apertures extending outward radially from said recess, a disc in said passage having [shaft means] *hubs, shafts* extending *outwardly from said hubs* into said apertures, bearings on the [shaft means] *shafts* in said apertures, and means for preventing fluid flow in said passage when the disc is in closed position, said means comprising a one-piece, hollow, resilient ring filling said recess, [and extending around said bearings, said ring pressing against the peripheries of said bearings and against the periphery of the disc in the vicinity of said bearings with fluid-sealing contact.] *said ring being engageable with the ends of the hubs entirely around the shafts, with the full circumference of the bearings on the shafts and with the remainder of the periphery of the disc, and conduit means for delivering fluid under pressure into said ring and pressing the latter against the hubs, bearings and periphery of the disc with fluid-sealing contact.*

2. A valve comprising a body having a cylindrical passage, an annular recess opening into said passage, and diametrically opposed apertures extending outward radially from said recess, a disc in said passage having [shaft means] *hubs, shafts* extending *outwardly from said hubs* into said apertures, bearings on the [shaft means] *shafts* in said apertures, *deformable means secured to said disc at its edge,* and means for preventing fluid flow in said passage when the disc is in closed position, said means comprising a one-piece, hollow, resilient ring filling said recess, [and surrounding said bearings, and deformable means secured to said disc at its edge, said ring engaging said bearings with fluid-sealing contact, and said deformable means engaging said ring and said shaft means with fluid sealing contact.] *said ring being engageable with the ends of the hubs entirely around the shafts, with the full circumference of the bearings on the shafts and with the remainder of the periphery on the disc, and conduit means for delivering fluid under pressure into said ring for pressing the latter against the hubs, bearings*

*and periphery of the deformable means with fluid sealing contact.*

3. A valve comprising a body having a cylindrical passage, an annular recess opening into said passage, and diametrically opposed apertures extending outward radially from said recess, a disc in said passage having [shaft means] *hubs, shafts* extending *outwardly from said hubs* into said apertures, bearings on the [shaft means] *shafts* in said apertures, *deformable means secured to said disc at its edge,* and means for preventing fluid flow in said passage when the disc is in closed position, said means comprising a one-piece, hollow, resilient ring filling said recess [and surrounding and seated on said bearings, and deformable means secured to said disc at its edge, and engaging said ring and said shaft means with fluid sealing contact.] , and *closing the open side of said recess, said ring being engageable with the said deformable means throughout its full circumferential extent, with the ends of said hubs entirely around said shafts, with the full circumference of said bearings and with the outer wall of the recess entirely around said apertures, and conduit means for delivering fluid under pressure into said ring to press the latter against said deformable means, hubs, bearings and outer wall of the recess, all with fluid sealing contact.*

*4. A valve comprising a body having a cylindrical passage, an annular recess having an open side communicating with said passage and diametrically opposed apertures extending outward radially from said recess, a disc in said passage having hubs, shafts extending outwardly from said hubs into said apertures, and means for preventing fluid flow in said passage when the disc is in closed position, said means comprising a circumferentially continuous, hollow, resilient ring in said recess having a wall at the open side of said recess engageable with said hubs entirely around the shafts and with the remainder of the periphery of the disc and a conduit to bring fluid pressure into the ring and urge said wall against said hubs and periphery of the disc with fluid sealing contact.*

*5. A valve comprising a body having a cylindrical passage, an annular recess having an open side communicating with said passage and diametrically opposed apertures extending outward radially from said recess, a disc in said passage having hubs, shafts extending outwardly from said hubs into said apertures, and means for preventing fluid flow in said passage when the disc is in closed position, said means comprising a circumferentially continuous, resilient annular wall closing the open side of said recess and engageable with the entire periphery of the disc and with the ends of said hubs entirely around said shafts, said wall including tubular portions integral with and*

*extending radially outward from said wall and encircling said shafts, and conduit means for delivering fluid under pressure into said recess against the outer side surfaces of said tubular portions and the recess-facing surface of said wall, said fluid pressure serving to urge said tubular portions toward the shafts extending therethrough and to press said wall with fluid-sealing pressure against the periphery of said disc and against the hubs of the disc completely around said shafts.*

*6. A valve comprising a body having a cylindrical passage, an annular recess opening into said passage and diametrically opposed apertures extending outward radially from said recess, a disc in said passage having diametrically opposed hubs provided with plane end surfaces, shafts extending outwardly from the central part of and at substantially right anges to said end surfaces and into said apertures, and means for preventing fluid flow in said passage when the disc is in closed position, said means comprising a circumferentially continuous, resilient annular wall engageable with the said inner surfaces of the hub entirely around the shafts and also with the remainder of the periphery of the disc, said wall having tubular portions extending radially outward therefrom in said recess and encircling said shafts, and conduit means for delivering fluid under pressure into said recess against the outer side surfaces of said tubular portions and the recess facing surface of said wall, said fluid pressure serving to urge said tubular portions toward the shafts extending therethrough and to press said wall with fluid-sealing pressure against the periphery of said disc and against the hubs of the disc completely around said shafts.*

ALFRED C. DANKS.

REFERENCES CITED

The following references are of record in the file of this patent:

UNITED STATES PATENTS

| Number | Name | Date |
|---|---|---|
| 965,999 | Faget | Aug. 2, 1910 |
| 1,248,926 | Schantz | Dec. 4, 1917 |
| 1,458,144 | Olinger | June 12, 1923 |
| 1,813,126 | Sheppard | July 7, 1931 |
| 1,834,870 | Rogers | Dec. 1, 1931 |
| 1,844,641 | De Wein | Feb. 9, 1932 |
| 1,977,351 | Phillips | Oct. 16, 1934 |
| 1,990,309 | Phillips | Feb. 5, 1935 |
| 2,385,510 | Harwood | Sept. 25, 1945 |

FOREIGN PATENTS

| Number | Country | Date |
|---|---|---|
| 278,311 | Great Britain | of 1928 |
| 435,059 | Great Britain | of 1935 |